United States Patent
Hall et al.

(10) Patent No.: US 7,301,985 B1
(45) Date of Patent: Nov. 27, 2007

(54) PSEUDO-NOISE CODE HOPPING METHOD AND APPARATUS

(75) Inventors: Eric K. Hall, Sandy, UT (US); Thomas R. Giallorenzi, Riverton, UT (US); Richard B. Ertel, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 757 days.

(21) Appl. No.: 10/610,968

(22) Filed: Jun. 30, 2003

(51) Int. Cl.
*H04B 1/69* (2006.01)

(52) U.S. Cl. .................................... 375/130

(58) Field of Classification Search .......... 375/130, 375/133, 140, 146, 141; 370/342, 335; 708/250; 711/220
See application file for complete search history.

(56) References Cited

U.S. PATENT DOCUMENTS

| | | | | |
|---|---|---|---|---|
| 5,432,814 A * | 7/1995 | Hasegawa | ............... | 375/133 |
| 5,583,853 A | 12/1996 | Giallorenzi et al. | ........ | 370/441 |
| 5,696,789 A * | 12/1997 | Jones et al. | ................ | 375/130 |
| 5,751,761 A * | 5/1998 | Gilhousen | ................... | 375/146 |
| 5,774,808 A | 6/1998 | Sarkioja et al. | ............ | 455/436 |
| 5,815,526 A | 9/1998 | Rice | ............................. | 375/206 |
| 5,966,373 A | 10/1999 | Stephenson et al. | ........ | 370/335 |
| 6,023,462 A * | 2/2000 | Nieczyporowicz et al. | . | 370/335 |
| 6,061,339 A | 5/2000 | Nieczyporowicz et al. | . | 370/335 |
| 6,091,760 A * | 7/2000 | Giallorenzi et al. | ........ | 375/140 |
| 6,108,369 A | 8/2000 | Ovesjo et al. | .............. | 375/146 |
| 6,112,094 A | 8/2000 | Dent | ........................ | 455/452.1 |
| 6,163,524 A | 12/2000 | Magnusson et al. | ........ | 370/208 |
| 6,377,606 B1 | 4/2002 | Toskala et al. | ............. | 375/130 |
| 6,577,671 B1 | 6/2003 | Vimpari | ..................... | 375/146 |
| 6,760,317 B1 | 7/2004 | Honkanen et al. | .......... | 370/329 |
| 6,795,689 B1 | 9/2004 | Ogren et al. | ............. | 455/67.13 |
| 6,922,432 B2 * | 7/2005 | Callaway et al. | ........... | 375/141 |
| 7,099,372 B2 | 8/2006 | Nieczyporowicz et al. | . | 375/140 |
| 2002/0097703 A1 * | 7/2002 | Nieczyporowicz et al. | . | 370/342 |
| 2003/0154223 A1 * | 8/2003 | Henry et al. | ................ | 708/250 |

OTHER PUBLICATIONS

"Multiplex Systems Using Sums of Walsh Functions", Hubner, H., 1971 Proceedings, Second Edition, pp. 180-181.
"The Multiplexing of Telephone Signals by Walsh Functions", Davidson, I.A., Applications of Walsh Functions, 1971 Proceedings, Second Edition, Eds. R. W. Zeek and A.E. Showalter, pp. 177-179.
B. Unal. et al., "Code Hopping as a New Strategy to Improve Performance of S-CDMA Cellular Systems", Proc. IEEE Global Telecommunications Conf., 1996, pp. 1316-1319.
S. Parkvall, "Variability of User Performance in Cellular DS-CDMA-Long Versus Short Spreading Sequences", IEEE Transactions on Communications, vol. 48, No. 7, Jul. 2000.

* cited by examiner

*Primary Examiner*—Don N. Vo
(74) *Attorney, Agent, or Firm*—Harrington & Smith, PC (57) ABSTRACT

A PN code hopping method for mitigating cross-correlation interference is provided. The method includes the steps of providing a memory device and storing a plurality of PN codes, where each PN code is associated with a useful life cycle. The PN codes are pseudo-randomly accessed and used to spread a modulated signal for their respective useful life cycle before another PN code is pseudo-randomly retrieved.

15 Claims, 7 Drawing Sheets

PSEUDO-NOISE CODE HOPPING METHOD AND APPARATUS

CROSS-REFERENCE TO RELATED APPLICATIONS

This application is related to U.S. application Ser. No. 10/037,422, filed Oct. 24, 2001 now U.S. Pat. No. 7,099,372. This disclosure of this Non-provisional Patent Application is incorporated by reference herein in its entirety.

BACKGROUND OF THE INVENTION

1. Field of the Invention

This invention is generally related to telecommunications systems and apparatuses that employ spreading PN-codes and, in particular, relates to methods and apparatus for hopping PN-codes for mitigation of multi-user interference in code division multiple access (CDMA) systems.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

There are two basic types of SS systems: direct sequence spread spectrum systems (DSSS) and frequency hop spread spectrum systems (FHSS).

The DSSS systems spread the signal over a bandwidth $f_{RF}$ $R_c$, where $f_{RF}$ represents the center bandpass carrier frequency and $R_c$ represents the PN-code maximum chip rate, which in turn is an integer multiple of the symbol rate $R_s$. Multiple access systems employ DSSS techniques when transmitting multiple channels over the same frequency bandwidth to multiple receivers, each receiver having its own designated PN-code. Although each receiver receives the entire frequency bandwidth only the signal with the receiver's matching PN-code will appear intelligible, the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

As noted, the DHSS system PN-code sequence spreads the data signal over the available bandwidth such that the carrier appears to be noise-like and random, but is deterministic to a receiver using the same PN-code.

It is well known that the selection of PN-codes in CDMA systems is of critical importance. Ideal PN-codes are perfectly orthogonal in that the autocorrelation function for the PN-code has a large peaked maximum for perfect synchronization of two identical PN-code sequences; and zero cross correlation between different PN-codes sequences.

Of the number of possible sets of orthogonal functions that can be used as PN-code generators, Hadamard functions are recognized as being particularly well suited for their orthogonal properties. Hadamard functions can be described by Hadamard matrices with powers of 2 as ordinary numbers and are well known in the art. Other orthogonal systems can be derived from Hadamard matrices by permuting the columns while still preserving the original orthogonal characteristics.

One such derivation technique is the application of Walsh functions. Walsh functions are a set of binary and orthogonal waveforms that can be used for signal multiplexing purposes, and have long been recognized as having application to telephony. Reference in this regard can be had to an article entitled "The Multiplexing of Telephone Signals by Walsh Functions", by I. A. Davidson in Applications of Walsh Functions, 1971 proceedings; Second Edition, Eds. R. W. Zeek and A. E. Showalter, pages 177-179.

Another technique for creating PN-codes which are mutually orthogonal is to use a recursive construction technique defined by H. Hubner, "Multiplex Systems Using Sums of Walsh Functions as Carriers", also in Applications of Walsh Functions, 1971 proceedings, Second Edition, pages 180-191. Reference in this regard can also be had to U.S. Pat. No. 5,751,761, entitled "System and Method for Orthogonal Spread Spectrum Sequence Generation in Variable Data Rate Systems", by Klein S. Gilhousen.

In modular CDMA systems, such as cell systems where a base station controls what PN-codes are used, there are functions for generating PN-codes that, for all practical purposes, are completely orthogonal. In multiple cell systems, however adjacent cells using a common frequency band may have PN-code sets that may not have low cross-correlation values.

Another source of interference between adjacent cells arises from a common method used to increase the data rate of a DS-CDMA system operating with a fixed PN-code-chipping rate. This method implements variable rate spreading PN-codes where very few chips modulate each symbol in order to increase the effective symbol rate of the system, but at the expense of a decreasing spreading gain. The disadvantage of using the smaller spreading gains is that there will be instances where users in adjacent cells use PN-codes that are highly cross-correlated for a given offset, resulting in potentially significant amounts of interference. In a DS-CDMA system where users are assigned fixed PN-codes, using the wrong PN-code at the wrong offset can result in significant levels of adjacent channel interference for every transmitted symbol. Users in this situation would experience a much lower signal-to-noise ratio than other users in the cell. To combat this worst-case situation, PN cover PN-codes are typically used in the adjacent cells, effectively scrambling the spreading PN-codes and reducing the frequency of perfect and highly correlated levels of interference. A cover PN-code would slightly reduce the signal-to-noise ratio for all users with the aim of preventing any user with a severe degradation in signal-to-noise due to adjacent cell PN-code cross-correlation.

While the use of cover PN-codes appears attractive to solving the problem of worst-case adjacent channel interference resulting from high levels of PN-code cross-correlation, there are several disadvantages with using cover PN-codes.

First, cover PN-codes are difficult in application, as the cover PN-code must be applied to all CDMA channels, including the control and random access channels. This results in potentially longer and more complex acquisition schemes and circuitry.

Another disadvantage that arises when applying a cover PN-code to the matrix of Walsh PN-codes is that the resulting Walsh PN-codes are unbalanced. This means that, over any symbol period the number of +1 valued chips and −1 valued chips are not equal in most of the resulting PN-codes. A balanced PN-code is a desirable property since it implies that the PN-codes are orthogonal to any DC offset in the receiver of the signal. In other words, if the chips are ±1 millivolts in the receiver, but there is a 2 millivolt DC offset in the signal at the input of the despreader, then the despreader would have to multiply the ±1 despreading PN-code with an input signal having values of +3 and +1 millivolts. However, if the PN-code is balanced over a symbol, then the DC offset will not affect the despreading process.

Therefore, it is desirable to provide a method and system to overcome the difficulties with cover PN-codes and to mitigate the worst-case adjacent cell interference problem and provide several advantages not available with cover PN-codes.

SUMMARY OF THE INVENTION

The foregoing and other problems are overcome, and other advantages are realized, in accordance with the presently preferred embodiments of these teachings.

In accordance with one embodiment of the invention a PN code hopping method for mitigating cross-correlation interference is provided. The method includes the steps of storing a plurality of orthogonal PN codes in a memory device and pseudo-randomly accessing the memory device to retrieve one of the PN codes. Each of the PN codes is associated with a useful life cycle and is used to spread a modulated data signal before the end of its useful life cycle when another PN code is pseudo-randomly retrieved.

In accordance with another embodiment the invention includes a pseudo-noise (PN) code hopping device. The device includes a memory device for storing time limited PN codes and an addressable multiplexer coupled to the memory device. An address generator coupled to the multiplexer selects which time limited codes are to be selected.

In another embodiment of the invention, there is a program storage device readable by a machine, tangibly embodying a program of instructions readable by a computer or executable by the machine to perform method steps for mitigating cross-correlation interference, the method including the steps of: storing a plurality of orthogonal PN codes in a user memory device; pseudo-randomly accessing the user memory device to retrieve one of the plurality of PN codes, wherein each of the plurality of PN codes is associated with a useful life cycle before another PN code is pseudo-randomly retrieved, and spreading a modulated data signal with the retrieved one of the plurality of PN codes.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
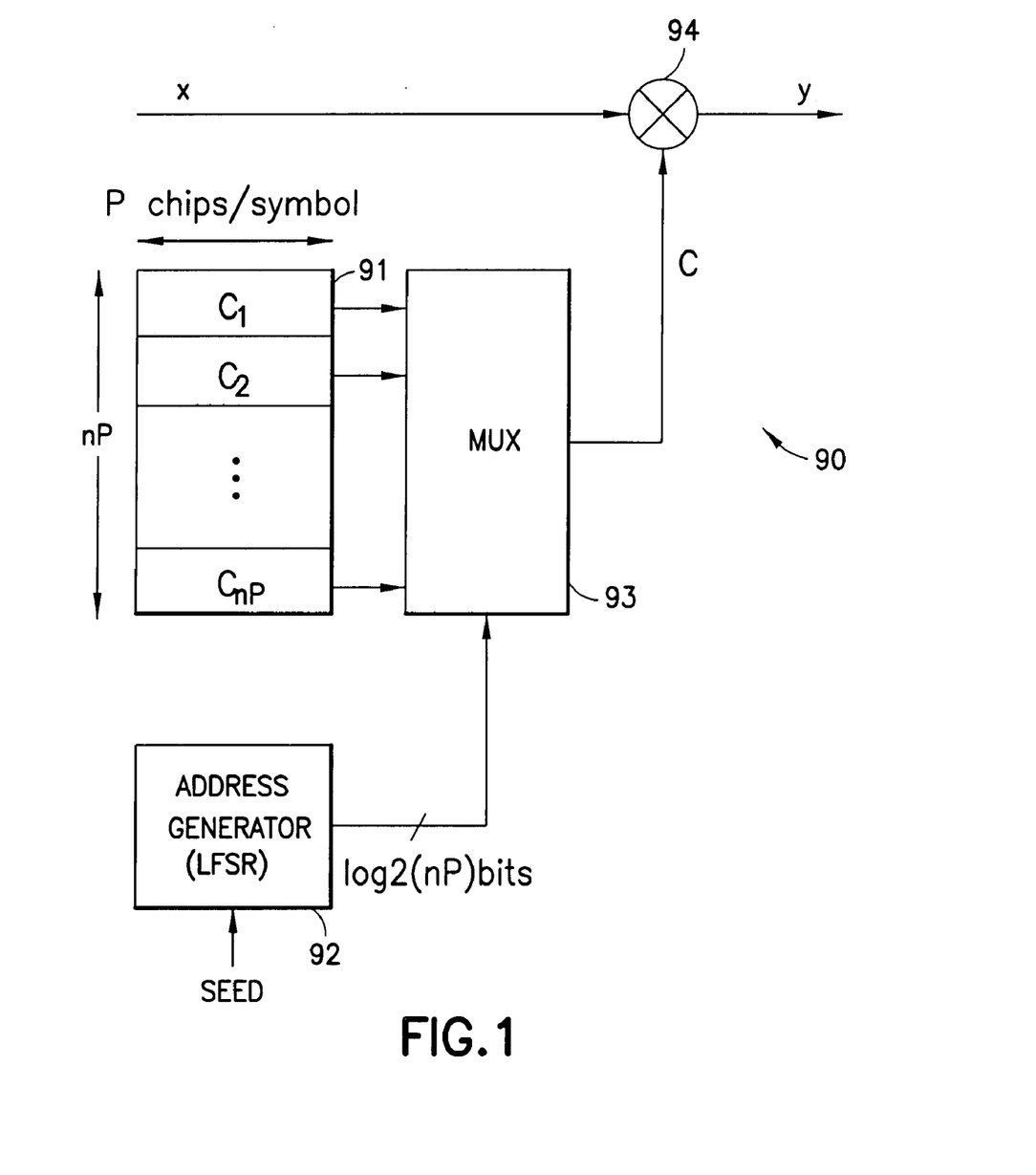
FIG. 1 is a block diagram of a system incorporating PN-code hopping features of the present invention.
Figure 2:
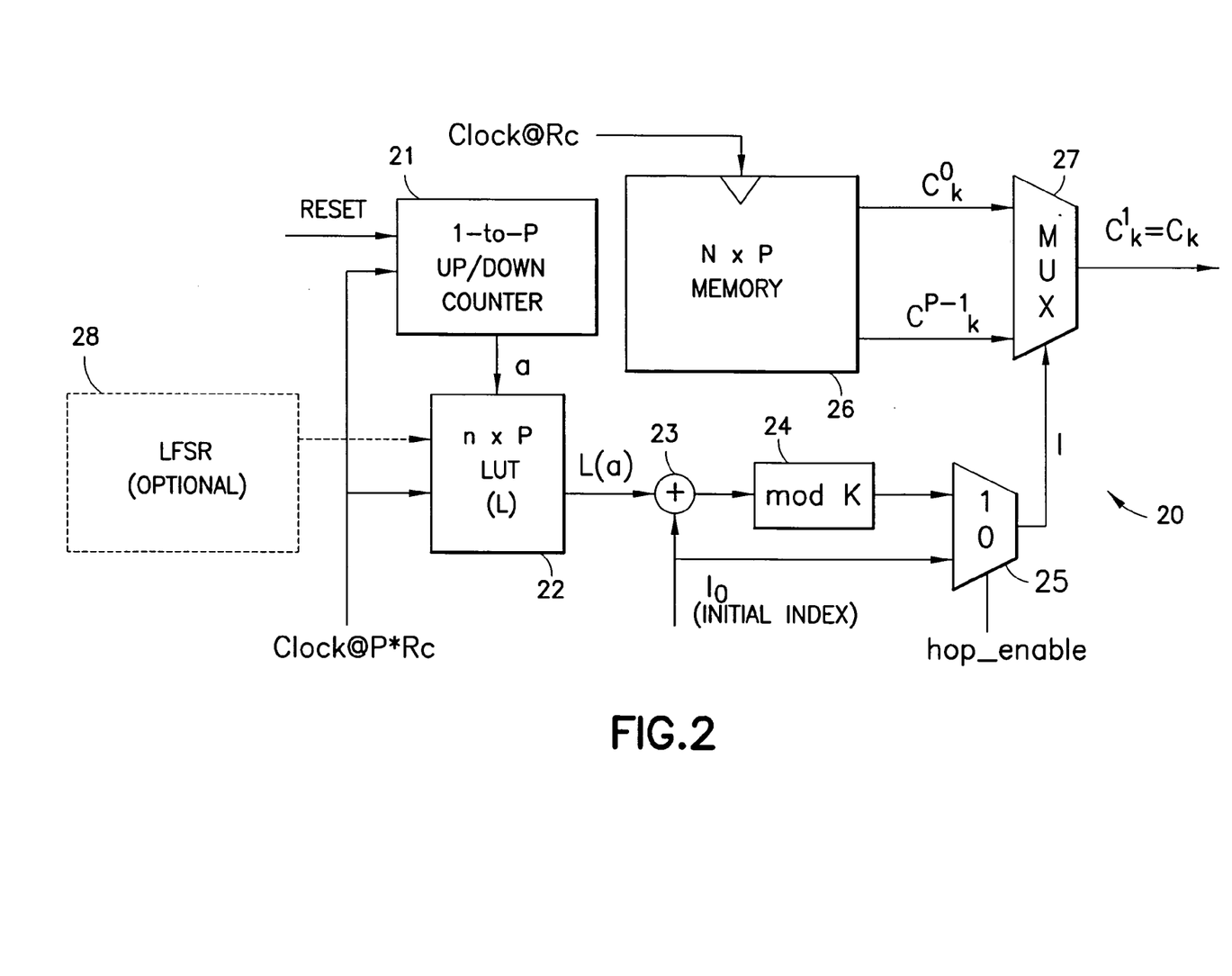
FIG. 2 is a block diagram of a homodyne DS-CDMA transmission system incorporating features of the present invention using spreading PN-code hopping with a look-up-table (LUT)

Referring to FIG. 1, there is shown a circuit diagram incorporating features of the present invention. Although the present invention will be described with reference to the embodiments shown in the drawings, it should be understood that the present invention could be embodied in many alternate forms of embodiments.

Figure 7:
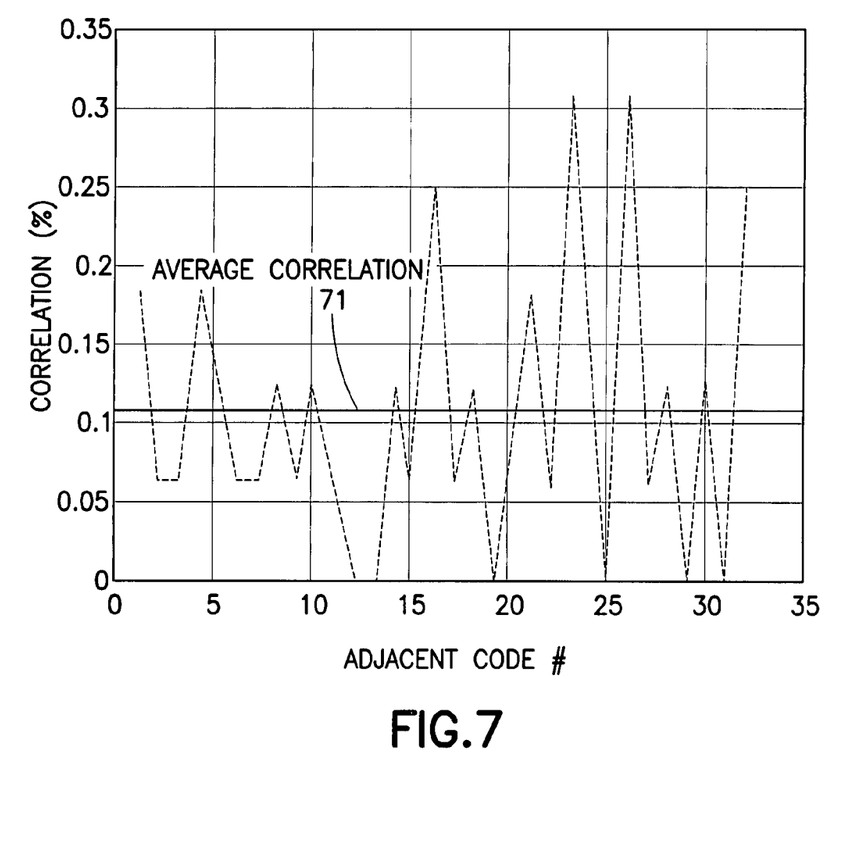
FIG. 7 is a graph of correlation of spread factor 32 (chips/symbol) spreading PN-code with a randomized set with spreading factor 32.

Referring now to FIG. 7 there is a graph representing correlation relationships between a PN-code (not shown) in a given cell and PN-codes in an adjacent cell. As shown, if the given PN-code of one cell happens to correlate with an adjacent PN-code, for example code 26 of another cell, the cross-correlation peak is relatively high and results in undesirable interference between the users. PN-code hopping features of the present invention allow the user to change the given PN-code on a symbol-by-symbol or block-by-block basis. Thus, the given PN-code correlates with all the adjacent PN-codes over a given time frame. This results in an averaging of interference as shown by the averaging line 71 in FIG. 7. PN-code-hopping features of the present invention may be adapted to homodyne spreading (using a single PN-code) or heterodyne spreading.

Figure 6:
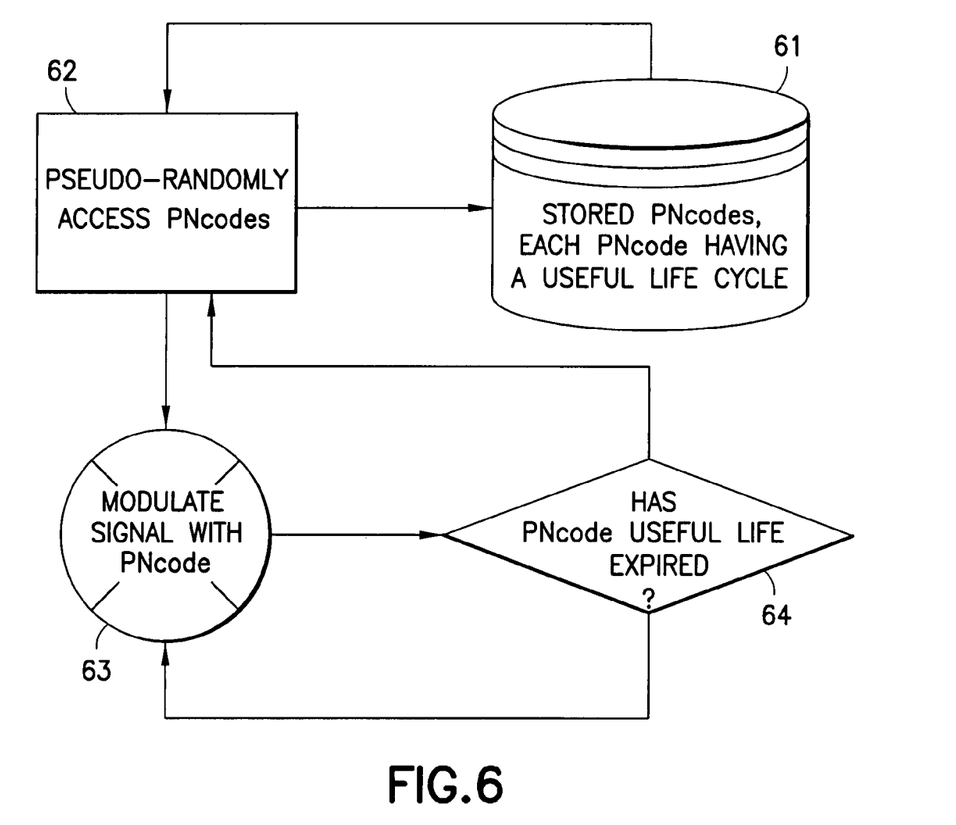
FIG. 6 is a flow chart for one method for implementing PN-code hopping features of the present invention in the system shown in FIG. 1.

Referring to FIG. 1, one embodiment incorporating PN-code hopping features of the present invention is shown in circuit 90. Referring also to FIG. 6 there is shown a flow chart for one method for implementing PN-code hopping features of the present invention in the system shown in FIG. 1. The circuit 90 incorporates memory 91, multiplexer(s) (MUX) 93 and address generator(s) 92. The address generator 92 generates sequences, step 62, which pseudo-randomly select a spreading PN-code for a current symbol or block of symbols. The PN-codes may be prestored, step 61, or in an alternate embodiment, may be generated and stored dynamically. The address generator 92 may be implemented using, for example, a look-up table (LUT) or a linear-feedback shift register (LFSR). A base PN-code set containing base PN-code vectors ($c_i$'s) is shown in memory structure 91. Preferably the base PN-code set is constructed from orthogonal designs with the PN-code vectors of sets ($c_1 \ldots c_P$), ($c_{P+1} \ldots c_{2P}$), $\ldots$ ($c_{(n-1)P+1} \ldots c_{nP}$) being mutually orthogonal. The address generator 92 may be clocked at a hopping rate or predetermined or useful life cycle of the PN-codes, and outputs a 1×P vector of chips to modulate (or spread) the data, step 63. Once the useful lifecycle of the PN code has expired, step 64, the address generator 92 again pseudo-randomly selects a PN-code from memory, step 62.

In alternate embodiments the address generator 92 may be any suitable address generator. Exemplary, but not limiting examples include linear-feedback shift registers or random access memories. In alternate embodiments the useful life cycle of a stored PN-code may be determined by a symbol rate or an integer multiple of a symbol rate. To hop or change PN-codes every symbol, the address generator 92 clocks at the symbol rate of the transmission. The address generator 92 is preferably designed such that collisions (i.e. two users using the same PN-code) are avoided.

In practice a user's device is assigned to a particular set of PN codes and given an initial seed and/or phase which is the starting point from which the address generator pseudo-randomly selects (hops) one of the PN codes. The set of assigned PN codes may be done at link establishment or may be predetermined and stored in the user's device. The initial phase is sufficient for both the transmitter and receiver to be able to recover (or despread) the data correctly. In a fixed-rate DS-CDMA system the spreading PN-code set is preferably partitioned into hopped and non-hopped PN-codes and a PN-code-hopping pattern and hop duration is specified. The hop duration can be either the symbol rate (chipping rate /P) or multiple chips or some integer multiple of the symbol rate. Hopping is not presently preferred in the middle of a symbol since orthogonality between users PN-codes could be compromised.

In a variable rate DS-CDMA system, users operate with a fixed chipping rate, but can choose spreading PN-codes with differing spreading gains in order to achieve different symbol rates. Typically, a minimum spreading gain is specified, for example, $P_{min}$ of 8 or 16, along with a maximum spreading gain $P_{max}=n\ P_{min}$. A variable rate spreading PN-code set is constructed from a base PN-code set having $P_{min}$ PN-codes. The variable rate spreading PN-code sets can be constructed using this base PN-code set via recursive techniques, or non-recursive techniques, as in U.S. Pat. No. 6,091,760 the contents of which is incorporated herein by reference in its entirety to the extent that it does not conflict with the teachings contained herein.

In either construction, a single base PN-code with $P_{min}$ chips/symbol will form two orthogonal PN-codes with 2 $P_{min}$ chips/symbol, four orthogonal PN-codes with 4 $P_{min}$ chips/symbol and so. The base PN-code or "parent code" is present in each of PN-codes with higher spreading gain.

For the case of PN-code hopping applied to variable rate CDMA, one method for incorporating PN-code-hopping features of the present invention is to hop at a multiple of the symbol rate of the lowest symbol rate (or highest spreading gain). Thus, a user using a PN-code at $P_{min}$ would use his PN-code for $k_n$ symbols, where $P_{max}=n\ P_{min}$, and a user using a spreading gain of $P_{max}$ would use his PN-code for k=1, 2 . . . , symbols. In this manner the orthogonality between PN-codes is preserved, but users with small spreading gain are caused to hop PN-codes at a slower rate than users at the larger spreading gains.

Figure 3:
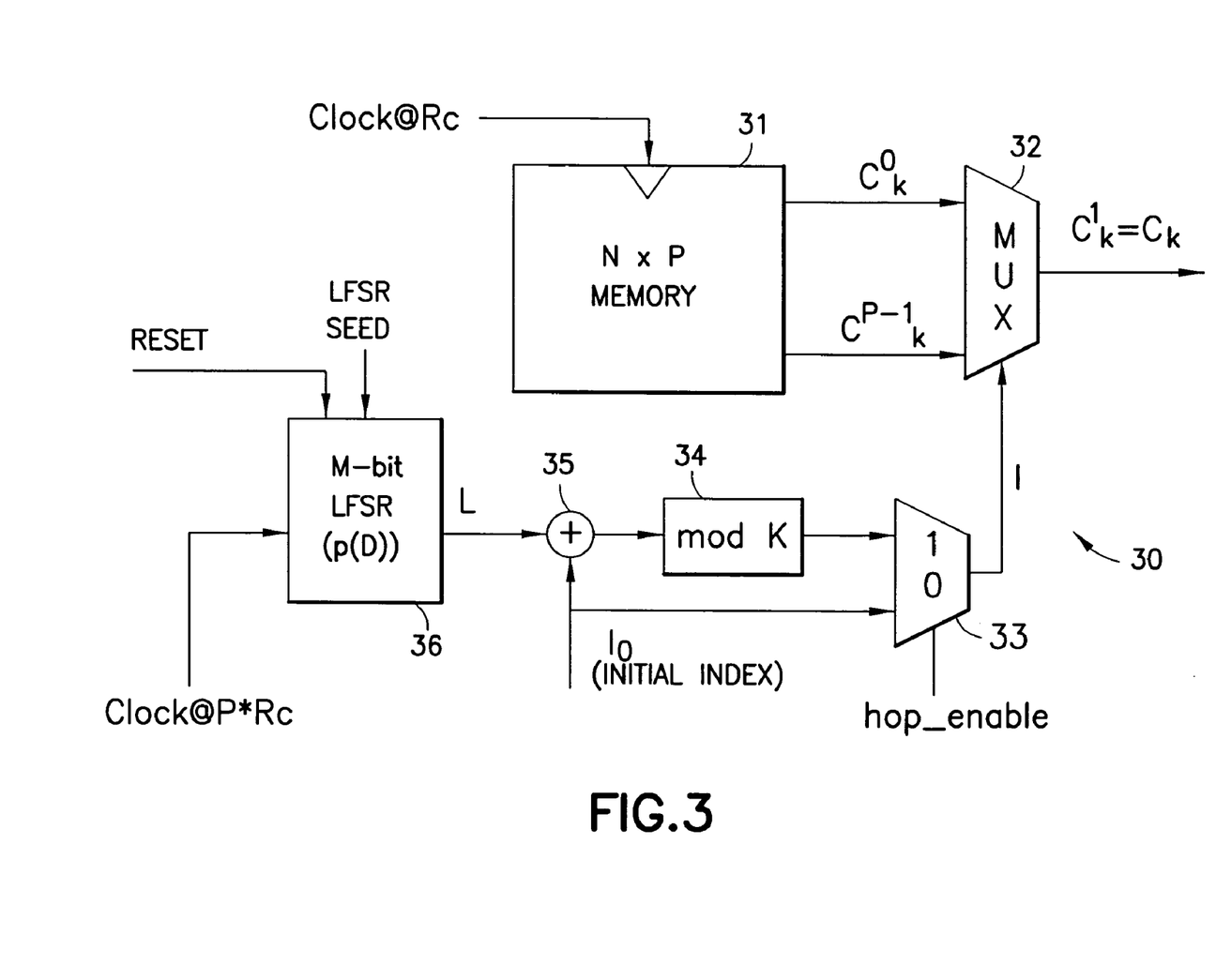
FIG. 3 is a block diagram of a homodyne DS-CDMA transmission system incorporating features of the present invention using spreading PN-code hopping with an linear-feedback shift register (LFSR)

Referring to FIG. 3 there is shown one embodiment of a spreading PN-code generator for implementing the PN-code-hopping features of the present invention in a homodyne DS-CDMA system. A PN-code set C is stored in an N×SF binary matrix 26 with spreading PN-codes denoted by 1×SF vectors C', where i is the PN-code row index. Any suitable memory device, or devices, may be employed to retain the PN-code set C. Exemplary, but not limiting examples include random access memory (RAM) devices, and read-only-memory (ROM) devices. In addition, any suitable PN-code set C may be stored in the memory device. The PN-code set may be predetermined and pre-stored or may be dynamically determined based upon changing variables and/or conditions. An exemplary, but not limiting example may include a fail-safe response to a failure of one of the memory devices, thus requiring re-optimizing the PN-code based upon available memory.

The circuit 20 clocks the memory 26 at a rate of Rc, generating N chips corresponding to the kth column of the C matrix. In the preferred embodiment the N-chip values are parallel clocked out. In alternate embodiments the N-chips could be serially outputted on, for example a universal serial bus (USB) and converted parallel with a suitable serial-to-parallel device. The N-chip values are presented to an N:1 multiplexer 27, where the address of the MUX 27 is the PN-code index for the current symbol, k is a chip index ranging from 0 to SF−1, and 1 is a PN-code index ranging from 0 to N−1. The PN-code index is generated from a look-up-table (LUT) 22 of size n×P where P is the period of the PN-code hopping and n is a bit-width with $n \geq \log_2(N)$. The address of the LUT 22 is generated by an up or down-counter 21 with both the LUT and counter operating at SF*Rc. In an alternate embodiment an operation, such as a modulo operation, may be performed by the modulo operator 24 on the LUT 22 output to ensure that a valid PN-code index is generated with $K \leq N$. The modulo operation can be avoided if the LUT 22 values are sized appropriately, or if K is a power of two, in which case limiting I to $n=\log_2(N)$ bits performs the modulo operation. Note, that if K<N, then some of the PN-codes (e.g. the PN-codes with 1>K) may be omitted from the hopping. For adjacent cell/sector isolation, adjacent cells/sectors may use LUTs containing different hopping patterns.

In an alternate embodiment un-hopped PN-codes may be desirable for random access channels or to remove certain CDMA channels from the hopping operating. When the hop_enable switch 25 is turned off the transmitted spreading PN-codes are un-hopped for that particular CDMA channel. These "unhopped" CDMA channels may be used, for example, for random access or pilot channel purposes.

In an alternate embodiment it may also be desirable to reset the hopping in accordance with link layer framing boundaries. Thus, a reset is shown for the up/down counter 21 (RESET).

Referring now to FIG. 3 there is shown another embodiment for implementing the PN-code-hopping features of the present invention in a homodyne DS-CDMA system 30 with an LFSF 36. The advantage of the LFSR 36 is that very long, random hop periods may be produced without large amounts of memory. The LFSR sequence is determined by the initial value of the LSFR (e.g. LFSR seed) and the feedback polynomial p(D). For an M-bit binary LFSR with feedback polynomial p(D), the period of the sequence L is less than $2^M$. For adjacent cell/sector isolation, adjacent cells/sectors may use different feedback polynomials and seeds. For long LFSRS, it is sufficient to use a feedback polynomial with a long period and use different phases (e.g. seeds) for the different cells/sectors.

In alternate embodiments, a LFSR or other suitable device may be used to randomly populate a LUT. Such an arrangement captures the fast response feature of a LUT while ensuring that a valid PN-code index is generated by the LUT. Another advantage is that the LFSR seed value and/or feedback polynomial can be changed as required to repopulate the LUT.

To maintain orthogonality between in-cell users, the in-cell users should preferably use the same hopping pattern (e.g. LUT or LFSR+seed) but be given unique initial PN-code indices ($l_0$).

In an alternate embodiment, the pseudo-random nature of selecting an input address of the addressable multiplexer may include the step of constraining the pseudo-random selection to select the input address based upon previously selected PN codes. For example, it may be desirable to maintain code balance to a predetermined tolerance. The address generator may then be constrained to pseudo-randomly select the next PN code from an area of the memory device with PN-codes of known balance.

In yet another embodiment the address generator may include a completely random, i.e., not deterministic, selection of PN codes. The random selection pattern is captured by the address generator and transmitted to a receiver ahead of the hopped PN-code modulated data signal.

Figure 4:
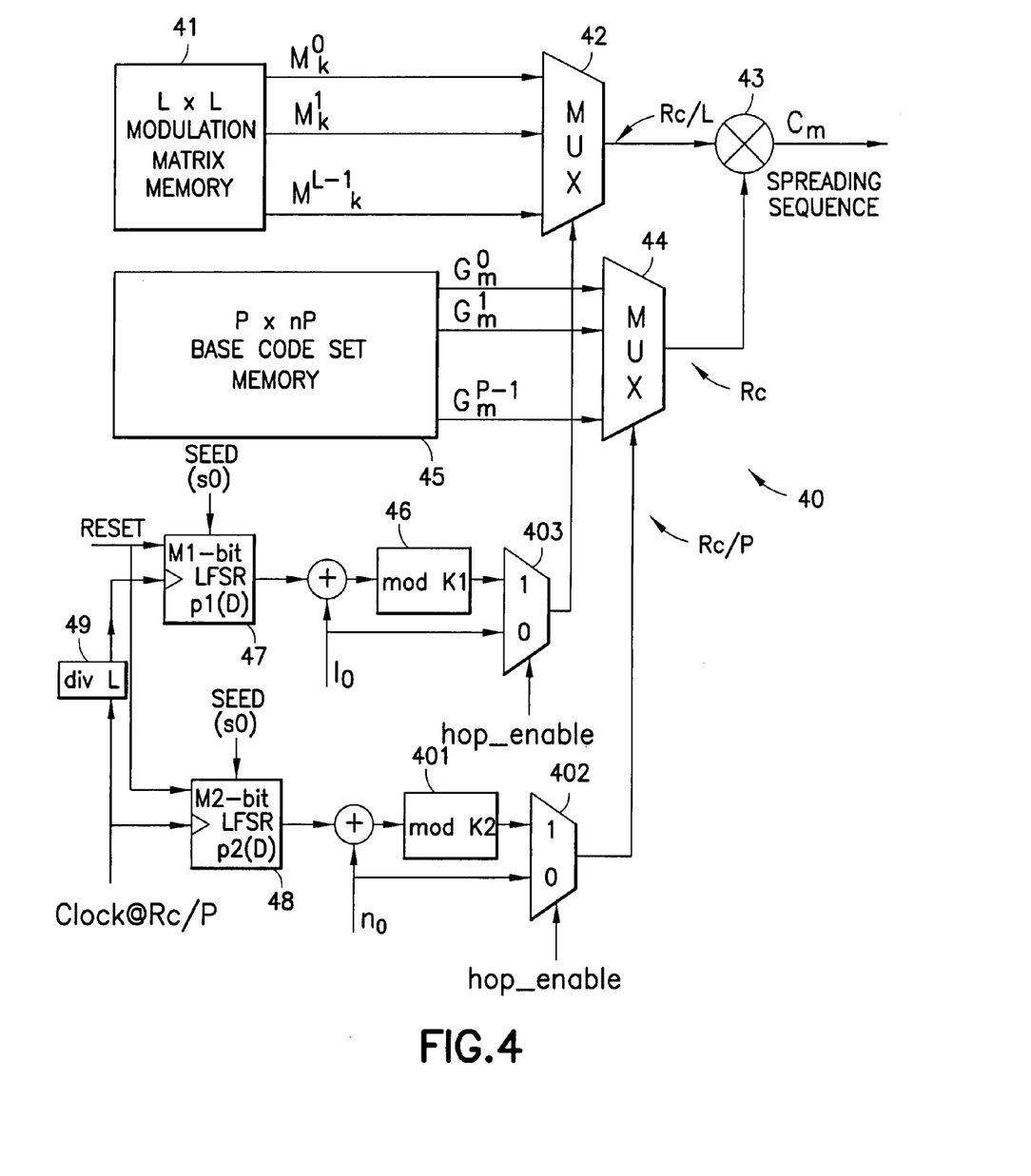
FIG. 4 is a block diagram of a spreading PN-code hopping system incorporating features of the present invention using LFSRs for heterodyne DS-CDMA systems.

Referring now to FIG. 4 there is shown an alternate method for incorporating PN-code hopping features of the present invention in a heterodyne spreading system 40. In heterodyne spreading a PN-code set is constructed from two base sets, a modulation matrix 41 and a base PN-code set 45. The constructed PN-code set is adapted for variable-rate DS-CDMA such that users operating at different data rates retain orthogonality. The variable-rate DS-CDMA operates with a minimum spread factor $SF_{min}$ and a maximum spread factor $SF_{max}$. Letting $L=SF_{max}/SF_{min}$, then L is preferably an integer and the modulation matrix has dimension L×L. Letting $P=SF_{max}/L$, then P is also preferably an integer and the base PN-code matrix has dimension P×nP where n is a PN-code order number.

It should be noted that heterodyne spreading alone, without the PN-code hopping features of the present invention, has the property that different PN spreading PN-codes are used for different symbols. Yet, disadvantageously, at the lowest spreading factor ($SF_{min}$), the spreading PN-codes repeat with period nL symbols. At the next spreading factor (2 $SF_{min}$), the spreading PN-codes again repeat with period nL/2 symbols. At the largest spread factor ($SF_{max}$), the spreading PN-codes repeat with period n symbols.

Figure 5:
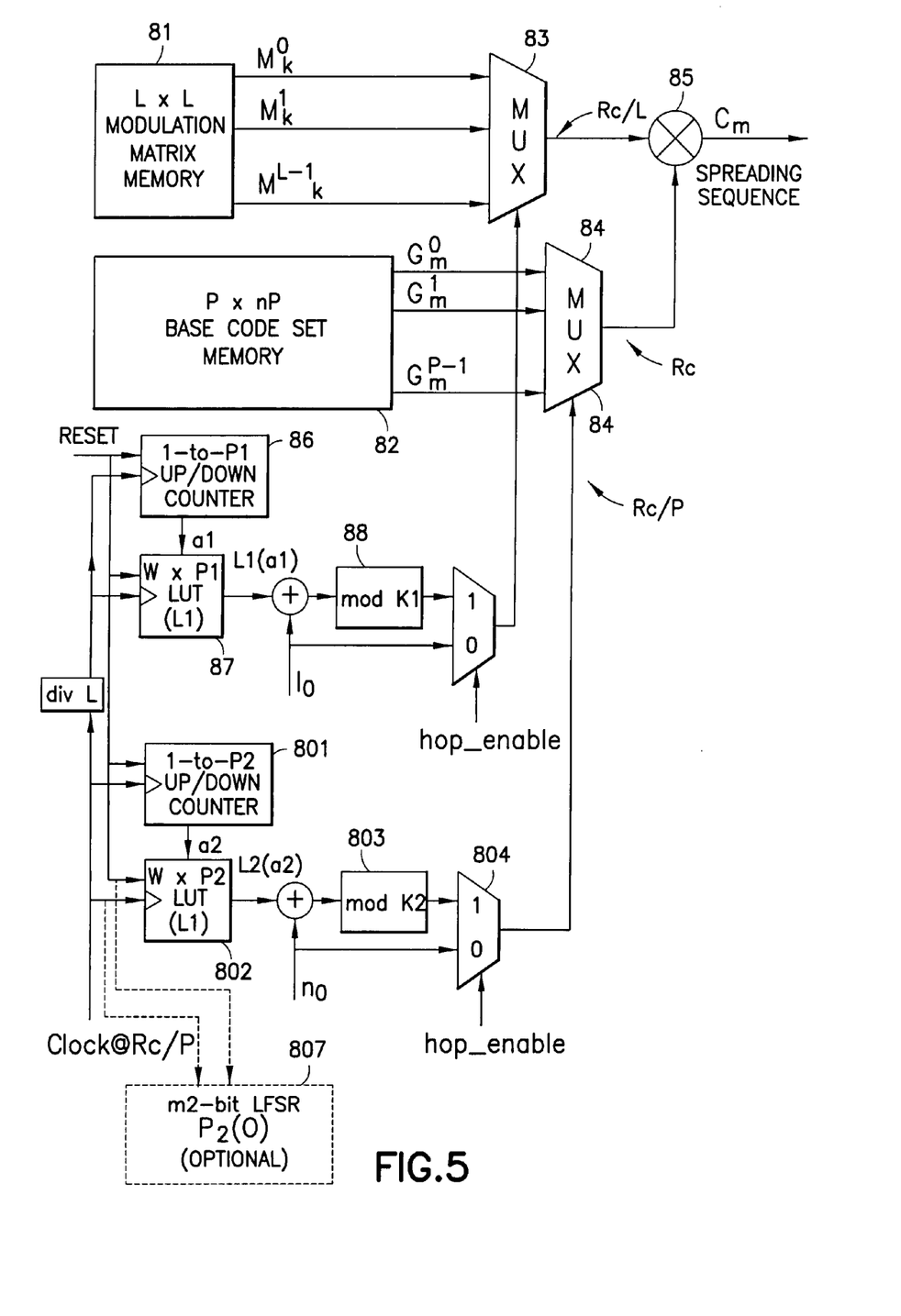
FIG. 5 is a block diagram of a spreading PN-code hopping system incorporating features of the present invention using LUTs for heterodyne DS-CDMA systems.

Because the spreading PN-codes repeat, even with heterodyne spreading, there is a likelihood of adjacent cell/sector interference. However, PN-code hopping features of the present invention may be implemented to increase the apparent randomness of the PN-code sequences. Referring still to FIG. 4, the row indices of the modulation matrix 41 and the base PN-code set 45 are varied to implement PN-code hopping. FIGS. 4 and 5 show the circuits for implementing PN-code hopping features of the present invention in a heterodyne spread system using LUTs and LFSRs, respectively. In alternate embodiments the heterodyne spread system could be adapted to use a LUT and a LFSR as represented in FIG. 5 for generation of the row indices.

Referring still to FIGS. 4 and 5, the modulation matrix 81, 41 row index hops with a period of P1 while the base PN-code set matrix hops with a period of P2. A total of K1≦L rows of the modulation matrix and K2≦P rows of the base PN-code set matrix are used for hopping. The total hopping period is related to n, P1, P2. Referring to FIG. 5, one method of PN-code hopping is sequential hopping, where the address generators 87,802 are controlled by up/down counters 86,801, respectively and may be individually seeded by integers 0 . . . P−1. Each user starts with unique seeds to avoid collisions with the seeds representing a pointer into the PN-code set tables.

FIGS. 4 and 5 show hopping of both the modulation matrix and the base PN-code set. In alternate embodiments, hopping of only the modulation matrix or the base PN-code set could be implemented in a heterodyne spreading system.

In a variable-rate DS-CDMA system using heterodyne spreading, it may be preferable to disable hopping of the modulation matrix since the variable-rate spreading factor identifies which rows of the modulation matrix may be used to maintain orthogonality. For example, channels at spread factor $SF_{min}$ may use only row 0 of the modulation matrix. Channels at spread factor $2xSF_{min}$ may use only rows 0 and 1 of the modulation matrix. A hopping PN-code may hop into a forbidden row and thereby reduce orthogonality.

It will be appreciated that the PN-code hopping features of the present invention provide several advantages over the prior art.

First, with the PN-code hopping features of the present invention, the PN-codes used for random access and control can be omitted from the hopping sequence. These non-hopped PN-codes can be acquired with reduced acquisition time and complexity.

Next, PN-code hopping preserves the balance in a PN-code set. Balanced PN-codes may be important for orthogonal DS-CDMA systems since balanced PN-codes mitigate DC biasing problems in the receiver. It will be further appreciated that the PN-code hopping features of the present invention will allow the use of sets of preferred PN codes containing unbalanced codes. One such preferred set of codes is the Gold codes. Gold codes are particularly useful in a multi-user environment since a large number of these codes can be generated and only require one pair of feedback tap sets in a code generating shift register. Yet, many of the Gold codes are unbalanced and would be unsuitable for many applications but for the code hopping features of the present invention. It will be further appreciated that PN-codes may be generated with out particular regard to their balance characteristics since the code hopping features of the present invention will minimize the effects of unbalanced codes. Standard error correction circuitry may then be employed to rid the signal of the deleterious effects caused by the unbalanced code. Thus, the code hopping feature of the present invention allows the dynamic generation of PN codes without having to first test the codes for acceptable balance.

Finally, orthogonal PN-code sets constructed using randomized Walsh-Hadamard matrices typically have P−1 balanced PN-codes and the all one's PN-code, which is unbalanced. In a system without a cover PN-code the all one's PN-code is unused due to DC bias problems and large correlation with adjacent cell PN-codes. The unusable all one's PN-code reduces the available PN-codes and therefore the capacity of the cell is reduced. With PN-code hopping, users only use the all ones PN-code for a symbol time or small time block. Thus, potential signal degradations due to adjacent cell interference and DC biasing problems is equivalent to the symbol time or time block the user is using the all ones PN-code and easily corrected using normal error control techniques; in this manner the capacity of the system is improved by 1/P percent.

It should be understood that the foregoing description is only illustrative of the invention. Various alternatives and modifications can be devised by those skilled in the art without departing from the invention. For example, PN-code hopping features of the present invention may be adapted to mitigate in-band or sector interference. Accordingly, the present invention is intended to embrace all such alternatives, modifications and variances that fall within the scope of the appended claims.

What is claimed is:

1. A PN code hopping device comprising:
at least one memory device, wherein the at least one memory device comprises:
a plurality of time limited PN codes;
an addressable multiplexer, wherein the addressable multiplexer is coupled to the at least one memory device;

an address generator wherein the address generator is coupled to the addressable multiplexer;
a N-x-Spreading Factor (SF) storage capacity, where N is an integer equal to a number of chips and SF is equal to N/symbol;
a universal serial bus (USB) port; and
a serial to N-parallel converter.

2. A PN code hopping device as in claim 1 wherein the at least one memory device further comprises:
a N-x-Spreading Factor (SF) storage capacity, where N is an integer equal to a number of chips and SF is equal to N/symbol; and
N-parallel outputs.

3. A PN code hopping device as in claim 1 wherein the addressable multiplexer comprises a N:1 multiplexer where N is an integer equal to a number of chips associated with one of the plurality of time limited PN codes.

4. A PN code hopping device as in claim 1 wherein the address generator comprises a look-up-table (LUT).

5. A PN code hopping device as in claim 1 wherein the address generator comprises a shift register.

6. A PN code hopping device as in claim 1 wherein the address generator comprises:
an up-down counter; and
a look-up-table, wherein the look-up-table is coupled to the up-down counter.

7. A pseudo noise (PN) code hopping system for mitigating cross-correlation interference between Direct Sequence-Code Division Multiple Access (DS-CDMA) users, the system comprising:
a first PN code hopping module, wherein the first PN code hopping module comprises:
a first memory device;
a first addressable multiplexer, wherein the addressable multiplexer is coupled to the first memory device;
a first address generator, wherein the first address generator is coupled to the first addressable multiplexer;
a second PN code hopping module, the second PN code hopping module is coupled to the first PN code hopping module, wherein the second PN code hopping module comprises:
a second memory device;
a second addressable multiplexer, wherein the addressable multiplexer is coupled to the second memory device; and
a second address generator, wherein the second address generator is coupled to the second addressable multiplexer.

8. A PN code hopping system as in claim 7 wherein the first memory device comprises:
a first modulation matrix of size L×L, where L is an integer equal to $SF_{max}/SF_{min}$, and where $SF_{max}$ is a maximum spread factor and $SF_{min}$ is a minimum spread factor and where $SF_{max}$ and $SF_{min}$ are integers, wherein the first modulation matrix comprises a first set of time limited PN codes; and
L parallel outputs.

9. A PN code hopping system as in claim 7 wherein the first addressable multiplexer comprises a L:1 multiplexer.

10. A PN code hopping system as in claim 7 wherein the first address generator comprises:
a first up-down counter; and
a first look-up-table (LUT), the first LUT coupled to the first up-down counter.

11. A PN code hopping system as in claim 7 wherein the first address generator comprises a first shift register.

12. A PN code hopping system as in claim 7 wherein the second memory device comprises:
a second modulation matrix of size P×nP, where $P=SF_{max}$, where L is an integer equal to $SF_{max}/SF_{min}$, where $SF_{max}$ is the maximum spread factor and $SF_{min}$ is the minimum spread factor, where $SF_{max}$ and $SF_{min}$ are integers, a code order number n is equal to a PN order, and wherein the second modulation matrix comprises a second set of time limited PN codes; and
P parallel outputs.

13. A PN code hopping system as in claim 12 wherein the second addressable multiplexer comprises a P:1 multiplexer.

14. A PN code hopping system as in claim 7 wherein the second address generator comprises:
a second up-down counter; and
a second look-up-table (LUT), the second LUT coupled to the second up-down counter.

15. A PN code hopping system as in claim 7 wherein the second address generator comprises a second shift register.

* * * * *